United States Patent [19]

McNaughton et al.

[11] Patent Number: 5,324,082
[45] Date of Patent: Jun. 28, 1994

[54] POSITIVE TRANSITION QUICK CONNECT COUPLING

[75] Inventors: James McNaughton, Rochester; Angelo Pacitto, Mt. Clemens; Mark G. Ketcham, Marine City, all of Mich.

[73] Assignee: Bundy Corporation, Warren, Mich.

[21] Appl. No.: 956,154

[22] Filed: Oct. 5, 1992

Related U.S. Application Data

[63] Continuation-in-part of Ser. No. 751,196, Aug. 29, 1991, Pat. No. 5,161,833.

[51] Int. Cl.⁵ .................................................. F16L 35/00
[52] U.S. Cl. ..................................... 285/93; 285/319; 285/351; 285/921
[58] Field of Search .................. 285/319, 351, 921, 93

[56] References Cited

U.S. PATENT DOCUMENTS

| 4,289,334 | 9/1981 | Riley | 285/351 X |
| 4,936,544 | 6/1990 | Bartholomew | 285/319 |
| 4,943,091 | 7/1990 | Bartholomew | 285/319 X |
| 4,946,205 | 8/1990 | Washizu | 285/319 |
| 5,002,315 | 3/1991 | Bartholomew | 285/319 X |
| 5,161,833 | 11/1992 | McNaughton | 285/319 |

*Primary Examiner*—Dave W. Arola
*Attorney, Agent, or Firm*—Dorn, McEachran, Jambor & Keating

[57] ABSTRACT

Two unique quick connect fluid coupling embodiments have a tube inner end which does not contact a seal if the tube is not fully connected. Preferably, a retainer retains the tube within the bore. The retainer is of the avalanche type such that a high force is required to insert the tube, and once this high force is overcome the momentum of the tube carries it to its fully inserted position. No seal is formed between the tube and seals within the housing unless the tube has moved beyond the avalanche point where the high force begins. Once the tube has moved beyond that point, it will be fully connected. The invention ensures that there would be no seal between a tube and a housing unless the tube is fully connected.

9 Claims, 5 Drawing Sheets

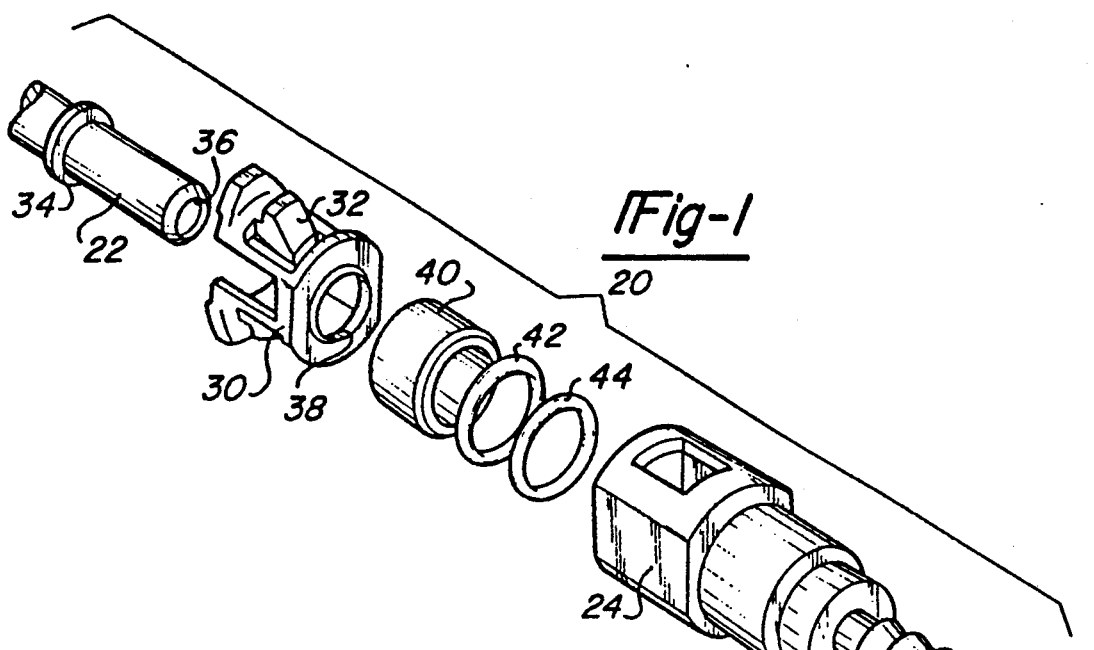
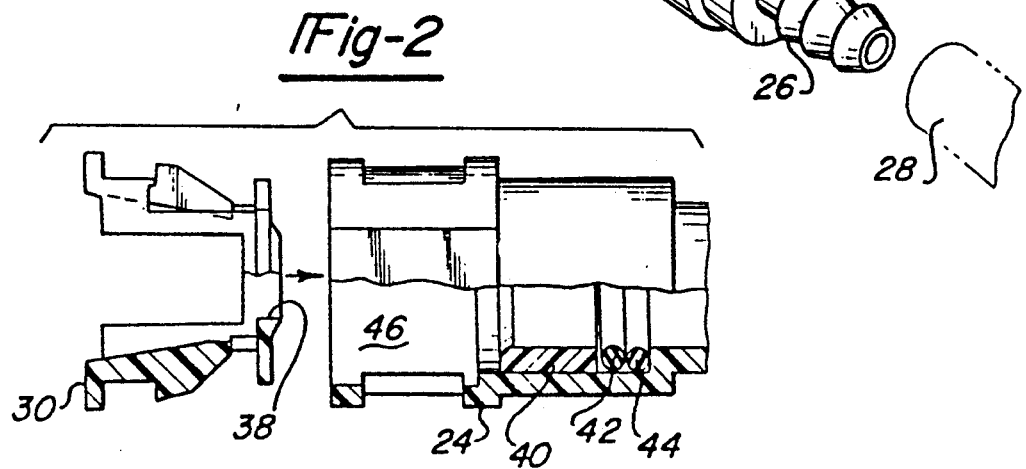
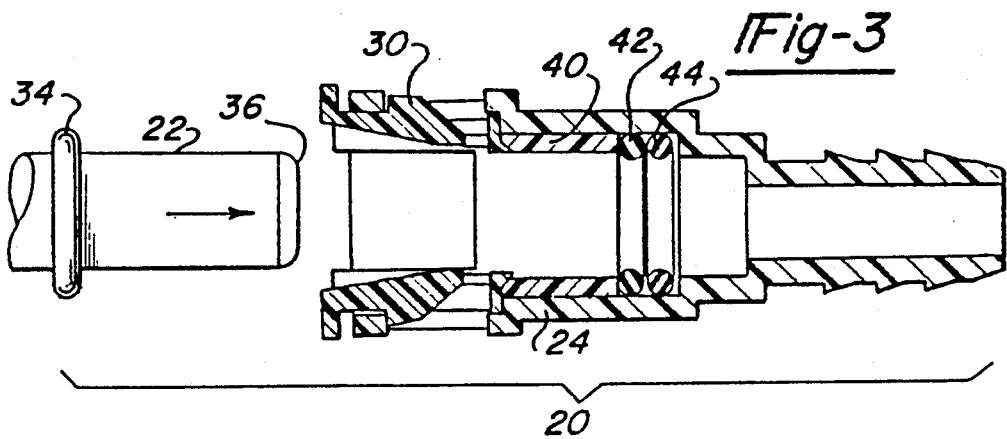

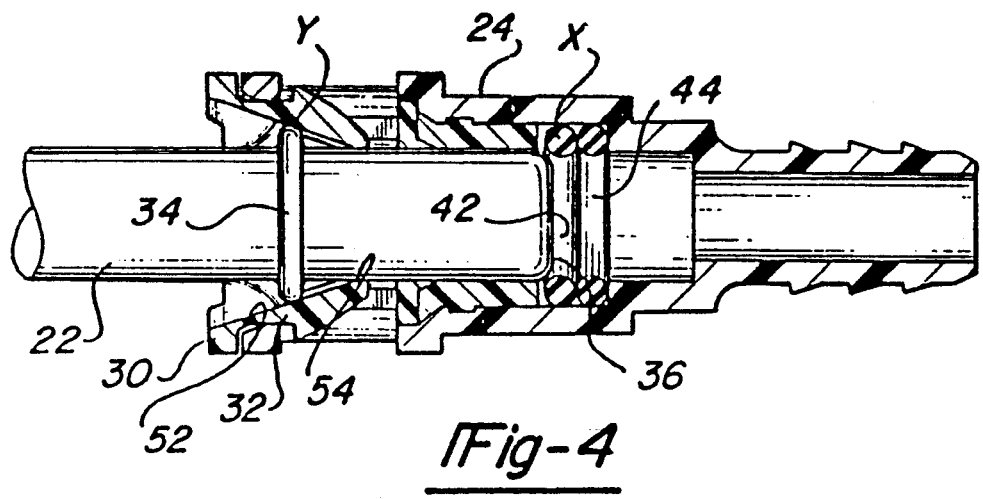
_Fig-4_
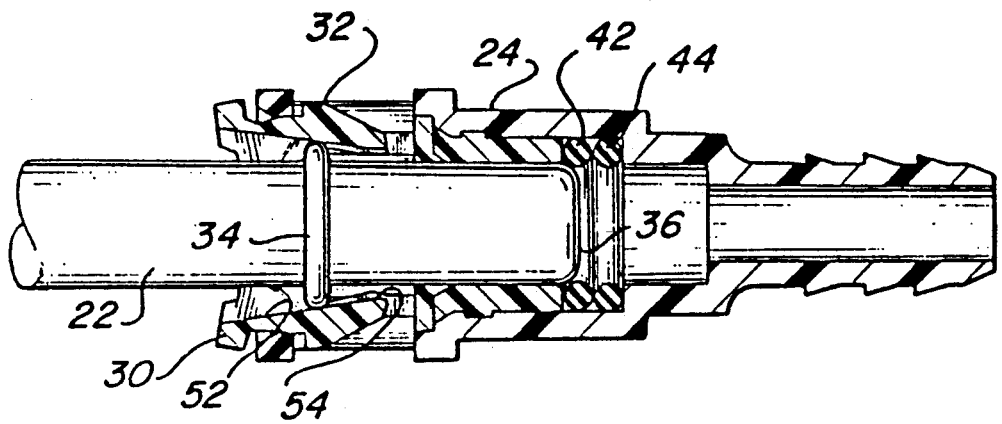
_Fig-5_

POSITIVE TRANSITION QUICK CONNECT COUPLING

This is a continuation-in-part of U.S. patent application Ser. No. 07/751,196, filed on Aug. 29, 1991, and now U.S. Pat. No. 5,161,833, issued on Nov. 10, 1992.

BACKGROUND OF THE INVENTION

This application relates to a quick connect fluid coupling which ensures that a tube is not sealed unless the tube is fully inserted into a connector structure.

Quick connect fluid couplings are well known in the art and used to quickly connect a tube to a housing or second tube. Several quick connect couplings are utilized in most modern vehicles to connect brake lines, air conditioning lines, power steering lines and other high pressure lines to a housing, or second tube.

A particularly successful prior art coupling consists of a spring or retainer received within a female housing bore. The retainer has a plurality of arms which extend radially inwardly in a direction moving axially into the bore. The tube has a radially greater upset portion which moves into the bore and abuts an inner peripheral surface of the arms. The axially and radially innermost ends of the arms define an inner diameter approximately equal to the other diameter of the tube at locations other than the upset portion. As the tube is inserted further into the bore, the upset portion forces the arms radially outwardly, and moves axially past the arms. Once the upset portion has moved axially beyond the arms, the arms spring back to a position where they are radially outwardly of the tube, and axially between the upset portion of the tube an outer end of the bore. The tube is then fully inserted, and the retainer securely retains the tube within the housing.

In one prior art coupling, the retainer is of a so-called "avalanche" type where the force required to insert the tube into the housing is at a first relatively low point for initial axial insertion, and then rises sharply to a relatively high point after the upset portion initially contacts the inner periphery of the arms. The point where this high required force begins is defined as an "avalanche" point. Once an operator has supplied sufficient force to overcome this high required force, the momentum carries the tube further axially inwardly and ensures that it is fully inserted.

Problems are sometimes encountered with this type of quick connect coupling since a tube inner end is at an axial position where it is aligned with seals in the housing prior to reaching the avalanche point. The seals engage the outer periphery of the tube and provides some resistance to further insertion of the tube. This may give a false impression or feel to the assembler that the high required force may have been overcome. Thus, the prior art has sometimes resulted in an assembler misinterpreting this feel as an assembler neglects to fully insert the tube for whatever reason, it is still possible that the prior art couplings will provide a seal between the tube and the housing.

It is undesirable for the tube not to be fully inserted since it could become disconnected in use. This is particularly true when the tube is used in a vehicle. With the prior art structure discussed above, should the tube not be fully inserted within the housing, a seal may still be provided between the housing and the tube. The seal may be adequate for a period of time until the vehicle has drive off the assembly line and away from the factory. The fluid pressure in the line, vibration or temperature cycling, will eventually cause the tube to become disconnected from the housing. It is far more preferable for the improper connection to be identified before the vehicle leaves the assembly line.

SUMMARY OF THE INVENTION

In one disclosed embodiment a quick connect fluid coupling does not provide a seal between a tube and a housing until the tube has moved beyond a point where it will be fully inserted. In one disclosed embodiment, a required tube insertion force begins at a low level, then increases sharply to a relatively high level at a first axial position. Once this relatively high level of force is overcome, momentum carries the tube to its fully inserted position. The axially innermost end of the tube is not received within a seal in the housing until the tube passes this first axial position. Thus, no false feel is given to an operator that the tube is fully inserted. Moreover, if the tube is not fully inserted there is no seal. If the vehicle is moved off of an assembly line, the high pressure fluid will noticeably leak.

The tube preferably has a radially greater upset portion spaced from an inner axial end. The retainer preferably has a number of resilient arms which extend radially inwardly from an outer end of the bore axially into the bore. The tube is inserted until the upset end initially contacts an inner peripheral surface of these arms. This initial insertion is the low level required force discussed above. This point is the first axial position, or avalanche point. Further insertion of the tube requires the upset portion to bias the arms radially outwardly, which requires the sharply increased tube insertion force.

As the tube moves beyond the avalanche point, the upset portion of the tube begins to bias the arms radially outwardly. The axially innermost end of the tube may then move into a first seal. As noted above, once this avalanche point is passed, the momentum of the tube carries it to its fully assembled position. Thus, it is desirable that the seal begin contacting the tube soon after the avalanche point is passed.

Further, any resistance to the tube insertion from the seal will occur within the area where the sharply increased force is provided. Thus, the resistance from the seal will be easily overcome, and will not provide a false feel to an operator.

In a most preferred embodiment of the present invention, the axially innermost end of the tube is adjacent to the axially outermost end of a first seal when the tube reaches this avalanche point. This preferred alignment of the seal and axial end of the tube results in the greatest amount of sealing possible, while still not providing a seal until the tube is fully inserted.

In a second embodiment, the tube has two stepped diameters positioned inwardly from the upset portion. Seals are positioned within the housing and associated with each of these two stepped portions. An axially outer seal is positioned radially outwardly from the radial position of an axially inner seal. The two stepped tube includes an inner portion which is radially smaller than an outer or body portion positioned between the inner portion and the upset portion.

When the tube is inserted into the housing and the upset portion initially contacts the retainer, the inner portion may be axially aligned with the outer seal, which is adapted to contact the outer portion. This seal will not sealingly engage the inner portion, however, as it is positioned radially outwardly from the outer peripheral service of the inner portion. Thus, no seal will be made at that position.

Once the tube moves further in, and the upset portion deforms the resilient arms radially outwardly, the inner portion of the tube will sealingly engage the axially inner seal. Further, the body portion of the tube will sealingly engage the outer seal. Thus, due to the unique construction of the tube and the positioning of the seals, two good seals are obtained after the relatively short axial movement. This may sometimes provide advantages over the first disclosed embodiment wherein the tube inner end must generally move through a longer axial length.

These and other objects and features of the present invention can be best understood from the following specification and drawings, of which the following is a brief description.

BRIEF DESCRIPTION OF THE DRAWINGS

FIG. 1 is an exploded perspective view of a construction embodying a first embodiment of the present invention.

FIG. 2 is a cross-sectional view of a portion of the construction shown in FIG. 1.

FIG. 3 is a cross-sectional view of the construction shown in FIG. 1.

FIG. 4 is a view similar to FIG. 3.

FIG. 5 is a view similar to FIG. 4.

DETAILED DESCRIPTION OF A PREFERRED EMBODIMENT

Figure 6:
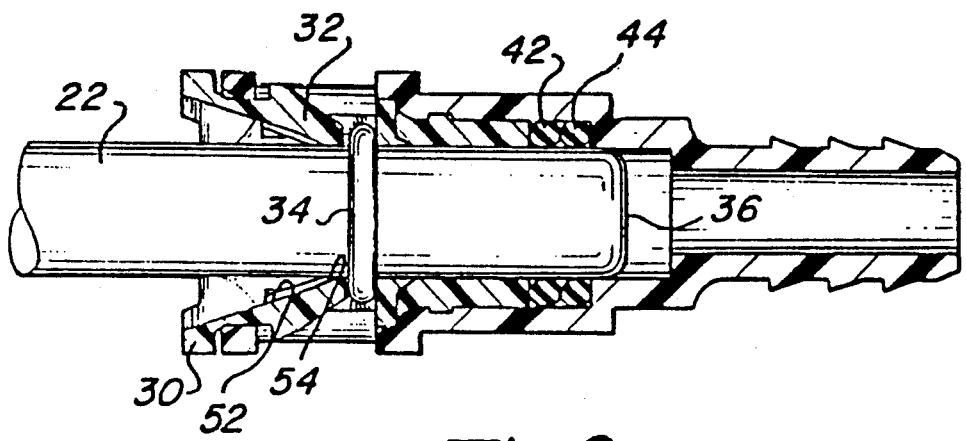
FIG. 6 is a view similar to FIG. 5.

FIG. 1 discloses a quick connect fluid coupling 20 for connecting a tube 22 within a housing 24. Housing 24 has structure 26 at a downstream end to be connected to a downstream tube 28.

A retainer 30 is inserted within housing 24 and includes a plurality of arms 32 which extend radially inwardly to abut an upset portion 34 of tube 22. Upset portion 34 is of a greater radial outer diameter than portions on either axial side of upset portion 34. An inner tube end 36 extends through an opening 38 in retainer 32, through spacer 40, and sealingly engages O-ring seals 42 and 44 to provide a fluid tight seal between tube 22 and housing 24.

As shown in FIG. 2, retainer 30 is inserted within bore 46 in housing 24. Bushing 40 and O-rings 42 and 44 are positioned in bore 46 axially inwardly of retainer 30.

As shown in FIG. 3, coupling 20 is assembled by inserting tube 22 into bore 46. Inner end 36 will eventually sealingly engage seals 42 and 44.

As shown in FIG. 4, tube 22 may be easily inserted into bore 46 until upset portion 34 initially contacts an inner peripheral surface of an arm 32. An outermost O-ring 42 is centered at a first axial position x. The location y on the inner periphery of arms 32 which upset portion 34 initially contacts is defined as a second axial position. The distance x-y between the first and second axial positions is greater than the distance between upset portion 34 and inner end 36 of tube 22. Thus, when upset portion 34 initially contacts the inner peripheral surface of arms 32, inner end 36 does not sealingly engage the outermost seal 42. At this point there is no seal provided between tube 22 and housing 24.

The point where upset portion 34 reaches second axial position y is known as the avalanche point. Up to this point the insertion force was low, it will now increase sharply.

As tube 22 continues to be inserted, upset portion 34 begins to bend arms 32 radially outwardly. This is known as the positive transition zone and is illustrated in FIG. 5. A sharply increased forced is required over the force required to insert tube 22 to the position shown in FIG. 4. As upset portion 34 is biasing arms 32 radially outwardly, inner end 36 of tube 22 begins to move within O-rings 42 and 44 and is sealingly engaged within housing 24.

Thus, as tube 22 is moving through the positive transition zone where the sharply increased force is required inner end 36 is also being forced into seals 42 and 44. Any resistance to insertion of tube 22 from seals 42 and 44 will occur during this sharply increased force zone, and thus the resistance by the seals will not provide any false feel to an assembler.

As shown in FIG. 5, a first radially inwardly inclined surface 52 is formed on arms 32 and extends to a second surface 54 which is formed at an angle generally parallel to the axis of the bore. Once upset portion 34 reaches the apex between portions 52 and 54, the force resisting insertion of tube 22 decreases rapidly. Upset portion 34 then snaps beyond second inclined portion 54 into a fully inserted position.

The force required to move tube 22 beyond the initial avalanche point, such as shown in FIG. 4, and through the positive transition zone, shown in FIG. 5, carries tube 22 to its fully inserted position shown in FIG. 6. Tube 22 is now fully inserted into housing bore 46. Upset portion 34 is received axially inwardly of an axially innermost end of arms 32. Tube 22 is securely retained within housing 24. Moreover, the axially inner end 36 of tube 22 is received radially inwardly of seals 42 and 44 providing a fluid tight seal.

As illustrated in FIGS. 4 and 5, when tube 22 has upset portion 34 at the second axial position y, or avalanche point, inner end 36 is spaced slightly from seals 42. Inner end 36 is beveled, and a portion of its beveled surface is axially aligned with an axially outer portion of outermost seal 42. Seal 42 is still spaced radially from inner end 36.

Once upset portion 34 begins to bias arms 32 radially outwardly into the positive transition zone, as shown in FIG. 5, inner end 36 immediately contacts the outermost seal 42. As shown in FIG. 6, once fully inserted inner end 36 is spaced axially inwardly from the outermost seal 42 by the maximum distance that still provides no seal until upset portion 34 moves into the positive transition zone.

Referring now to FIGS. 7-11, there is shown a quick connect tubing connector assembly 60 made in accordance with the teachings of a second embodiment of this invention. Specifically, assembly 60 includes a tube 62 having a beveled end 63 adjacent an inner portion 64 of a relatively small diameter and a body portion 66 of a relatively large diameter. As further shown, an upset portion 68 having a diameter greater than either the diameter of body portion 66 or inner portion 64 is positioned outwardly of body portion 66. Upset portion 68 is spaced a predetermined distance 70 from inner portion 64.

As further shown, assembly 60 includes housing 24 and retainer 30, including a plurality of resilient arms 32. As previously described, housing 24 provides a bore 46 having an opening 72, adapted to receive and secure tube 62 within bore 46. An inner seal 74 is positioned axially and radially inwardly from an outer seal 76. Inner seal 74 and outer seal 76 are both received in housing 24, with inner seal being thicker than thinner outer seal 76.

Figure 7:
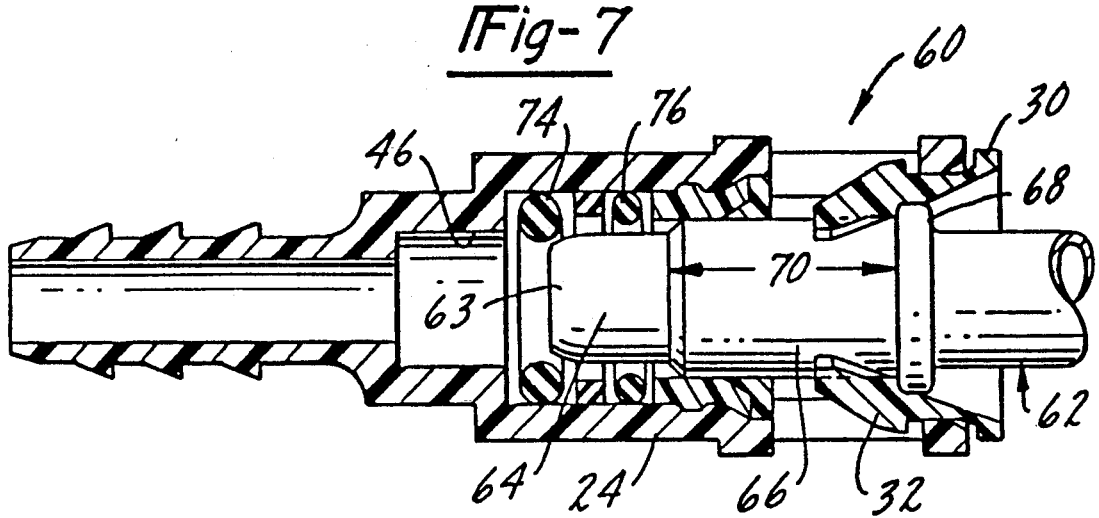
FIG. 7 is a cross-sectional view of a second embodiment of this invention.
Figure 8:
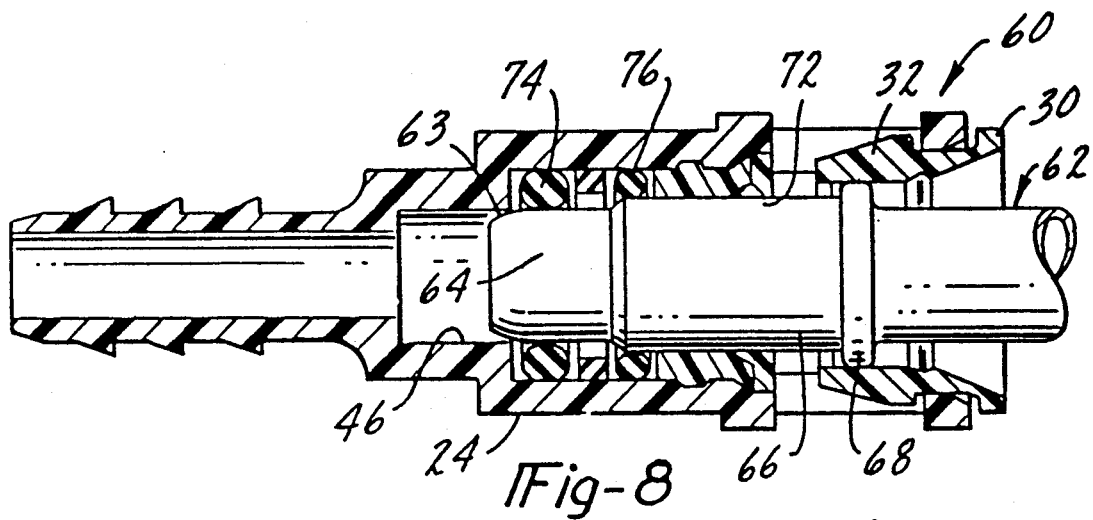
FIG. 8 is a view similar to FIG. 7.
Figure 9:
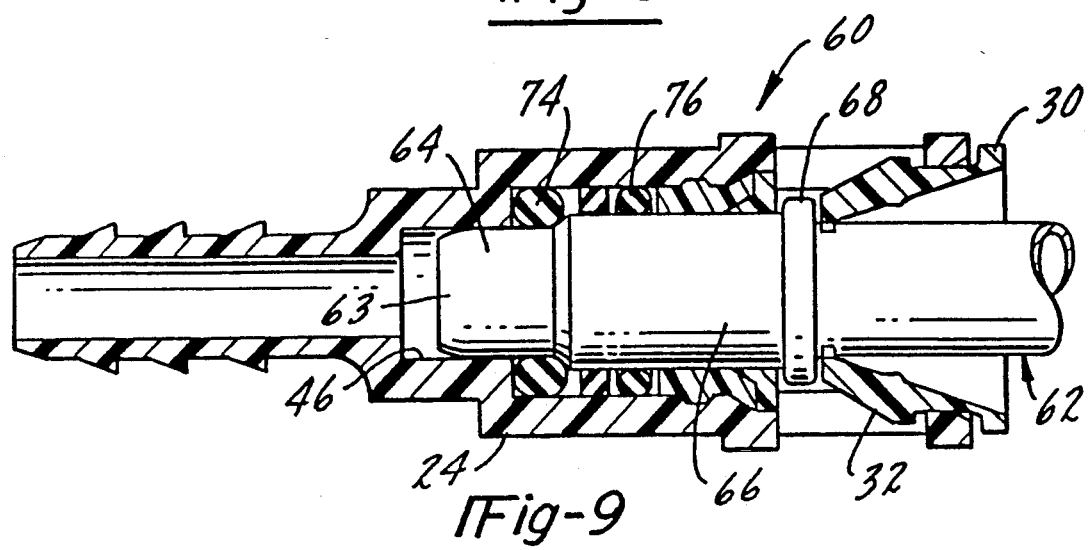
FIG. 9 is a view similar to FIG. 7.
Figure 10:
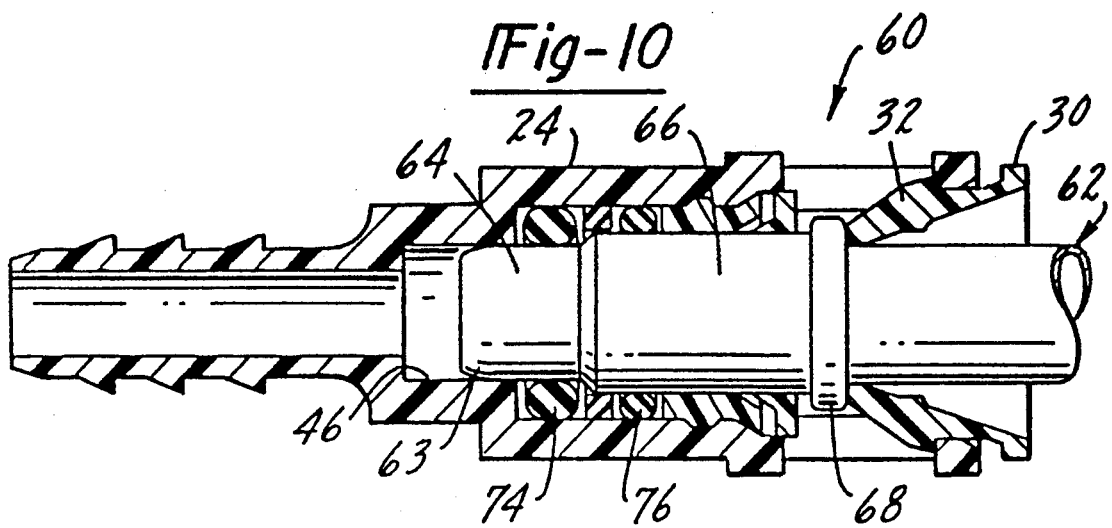
FIG. 10 is a view similar to FIG. 7.

As shown in FIG. 7, with the tube 62 initially inserted, inner portion 64 is axially aligned with outer seal 76. Outer seal 76 does not contact inner portion 64, and thus no seal is provided at this point. This position corresponds to the avalanche point. Once upset portion 68 begins to bias arms 32 radially outwardly, as shown in FIG. 8, inner portion 64 begins to contact inner seal 74 and body portion 66 begins to contact outer seal 76. As further shown in FIG. 9, upon further insertion of tube 62 the seals are fully made on tube 62. FIG. 10 shows the connector after application of fluid pressure.

With the inventive arrangement of the two stepped tube 62, and the positioning of the seal 74 and 76, one ensures that the seals are disposed axially upwardly far enough on the outer peripheral surface of tube 62, while still not requiring a great deal of tube travel past the avalanche point shown in FIG. 7. It is sometimes desirable to minimize the total movement between the avalanche point such as shown in FIG. 7, and the fully connected position such as shown in FIGS. 9 and 10. Further, it is sometimes desirable to ensure that the seals are positioned axially far upwardly along the outer peripheral surface of tube 62. The unique arrangement of the two stepped tube end provides both benefits.

Figure 11:
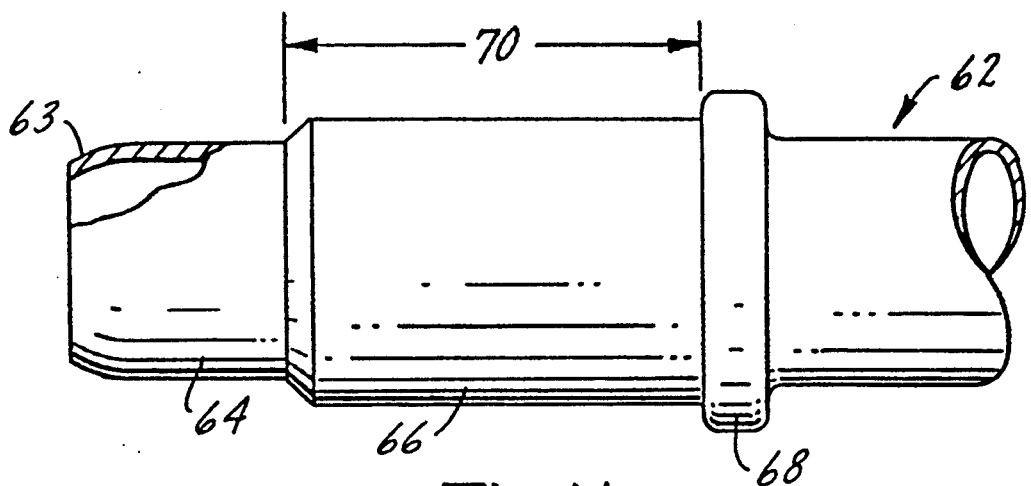
FIG. 11 is a cross-sectional view of a portion of the construction shown in FIG. 7.

As shown in FIG. 11, tube 62 includes two stepped portions including inner portion 64 and body portion 66, with a distance 70 defined between the axially outer end of inner portion 64 and the axially inner end of upset portion 68.

Preferred embodiments of the present invention have been disclosed, however, a worker of ordinary skill in the art would recognize that certain modifications would come within the scope of this invention. Thus, the following claims should be studied in order to determine the true scope and content of the invention.

We claim:

1. A quick connect tubing connector assembly comprising:
   a housing defining an axial bore extending inwardly into said housing from an entrance;
   a tube insertably into said bore;
   retention means associated with said tube and with said housing for retaining said tube in said bore, said retention means being positioned in said bore to define an avalanche point of tube insertion, such that upon insertion of said tube into said bore to an axial position corresponding to said avalanche point, maximum resistance to further inward insertion of said tube is provided by said retention means; and
   sealing means positioned within said bore such that upon insertion of said tube into said bore to an axial position corresponding to said avalanche point or to any axial position outward of said avalanche point, said sealing means are not in sealing contact with said tube and with said housing, and such that upon insertion of said tube to any axial position inward of said avalanche point, said sealing means are in sealing contact with said tube and with said housing.

2. A quick connect tubing connector assembly as recited in claim 1, wherein said retention means includes a retainer having resilient arms extending radially inwardly, and an upset portion of relatively large diameter formed on said tube, said upset portion deforming said resilient arms radially outwardly when said tube is at an axial point of insertion corresponding to said avalanche point, such that said tube may be further inserted to a fully inserted position wherein said upset portion is positioned inwardly of said arms, and wherein said arms are relaxed to a non-deformed position and abut said upset portion to prevent withdrawal of said tube from said bore.

3. A quick connect tubing connector assembly as recited in claim 2, wherein said retainer is constructed such that upon insertion of said tube into said bore to any axial position inward of said avalanche point, said tube will necessarily be moved to said fully inserted position without being retained at any intermediate positions.

4. A quick connect tubing connector assembly as recited in claim 2, wherein said tube includes a body portion positioned axially inwardly of said upset portion, said body portion having a diameter smaller than that of said upset portion, and an inner portion positioned axially inwardly of said body portion, said inner portion having a diameter smaller than that of said body portion.

5. A quick connect tubing connector assembly as recited in claim 4, wherein said sealing means consists of a first "O" ring seal seated in a seal housing portion of said bore axially inwardly of said retainer, and a second "O" ring seal seated in said seal housing portion of said bore axially inwardly of said first "O" ring seal.

6. A quick connect tubing connector assembly as recited in claim 5, wherein said second "O" ring seal is thicker than said first "O" ring seal.

7. A quick connect tubing connector assembly as recited in claim 6, wherein the axial lengths of said body portion of said tube and said inner portion of said tube are such that upon insertion of said tube into said bore to a position corresponding with said avalanche point, said inner portion of said tube is axially aligned with said first "O" ring seal but does not contact said first "O" ring seal.

8. A quick connect tubing connector assembly as recited in claim 7, wherein said axial lengths of said body portion of said tube and said inner portion of said tube are such that upon insertion of said tube to any axial position inward of said avalanche point, said inner portion of said tube is axially aligned with and contacts said second "O" ring seal, and said body portion of said tube is axially aligned with and contacts said first "O" ring seal.

9. A quick connect tubing connector assembly as recited in claim 8, wherein said seal housing portion of said bore is of uniform internal diameter.

* * * * *